(12) United States Patent
Yip et al.

(10) Patent No.: US 11,485,621 B2
(45) Date of Patent: Nov. 1, 2022

(54) SYSTEM AND METHOD FOR SENSING OCCUPANCY OF AN AERIAL LIFT DEVICE

(71) Applicant: Tricon Sales LLC, Bothell, WA (US)

(72) Inventors: Adrian Men Gee Yip, Snohomish, WA (US); Anand Rajaratnam, Seattle, WA (US); Doug Morrison, Kirkland, WA (US); Howard Gene Trott, Kirkland, WA (US); Kent Deric Eldredge, Jordon, UT (US); Mark Alexander Thomas, Seattle, WA (US)

(73) Assignee: Tricon Sales LLC, Seattle, WA (US)

( * ) Notice: Subject to any disclaimer, the term of this patent is extended or adjusted under 35 U.S.C. 154(b) by 543 days.

(21) Appl. No.: 16/581,092

(22) Filed: Sep. 24, 2019

(65) Prior Publication Data

US 2021/0087035 A1 Mar. 25, 2021

(51) Int. Cl.
| | |
|---|---|
| *G08B 21/02* | (2006.01) |
| *B66F 17/00* | (2006.01) |
| *G01V 1/00* | (2006.01) |
| *B66F 11/04* | (2006.01) |
| *H04W 84/18* | (2009.01) |
| *G01V 8/10* | (2006.01) |

(52) U.S. Cl.
CPC .......... *B66F 17/006* (2013.01); *B66F 11/044* (2013.01); *G01V 1/001* (2013.01); *G08B 21/02* (2013.01); *G01V 8/10* (2013.01); *H04W 84/18* (2013.01)

(58) Field of Classification Search
CPC ...... B66F 17/006; B66F 11/044; G01V 1/001; G01V 8/10; G08B 21/02; G08B 21/22; H04W 84/18
See application file for complete search history.

(56) References Cited

U.S. PATENT DOCUMENTS

| | | | |
|---|---|---|---|
| 2015/0027808 A1* | 1/2015 | Baillargeon | A62B 35/0025 182/19 |
| 2020/0207600 A1* | 7/2020 | Bonnefoy | B66F 11/044 |

* cited by examiner

*Primary Examiner* — Hongmin Fan
(74) *Attorney, Agent, or Firm* — Davis Wright Tremaine LLP; Michael J. Donohue

(57) ABSTRACT

Sensors on an aerial lift device determine the number of occupants in and occupant portion of the aerial lift device. Prior to permitting the occupant portion to rise up off the ground, the system checks the engagement of safety harnesses to verify that the number of engaged safety harnesses matches the number of occupants in the occupant portion of the aerial lift. If the number matches, operation of the aerial lift may be enabled and the occupant portion deployed. If the number does not match, an alarm is sounded and deployment of the occupant portion may be disabled. With pre-deployment safety testing, and no occupants in the occupant portion, the occupant portion may be deployed to verify all operational status of the occupant portion with no occupants. The system may further create a data log to verify the time and successful pre-deployment safety check.

28 Claims, 6 Drawing Sheets

SYSTEM AND METHOD FOR SENSING OCCUPANCY OF AN AERIAL LIFT DEVICE

BACKGROUND OF THE INVENTION

Field of the Invention

The present disclosure relates generally to aerial lift buckets, and more particularly, to a system and method for determining occupancy of an aerial lift device, such as a platform or bucket.

Description of the Related Art

Aerial lifts are aerial platforms designed to lift one or more persons off the ground to an elevated work position. In one embodiment, the aerial lift may be vehicle-mounted, such as cherry pickers or bucket trucks, used to access utility lines and other above-ground job sites. Aerial lifts have replaced ladders and scaffolding on many job sites due to their mobility and flexibility. They may be made of metal, fiberglass reinforced plastic, or other materials. They may be electrically or hydraulically powered or manually operated, and are considered to be aerial lifts whether or not they can rotate around a primarily vertical axis. Many workers are injured or killed on aerial lifts each year. The major causes of fatalities are falls, electrocutions, and collapses or tip overs.

A common element of aerial lift safety protocols includes the use of a body harness or restraining belt with a lanyard attached to the boom or bucket to prevent the worker(s) from being ejected or pulled from the bucket. These systems are only effective when the lanyard is securely attached to the boom or bucket. While there are conventional methods to determine if an operator is securely attached (i.e., clipped in) and alert, there is no system that identifies when there is more than one person in an aerial lift and therefore requires more than one clip-in. Therefore, it can be appreciated that there is a significant need for a system and method for detecting the number of occupants in a lift bucket. The present disclosure provides this and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

As will be described in detail below, the present disclosure describes implementation of an aerial lift bucket in which the number of occupants can be determined. Once the number of occupants have been determined, the system looks to determine whether each occupant has engaged their safety harness. Various alarms are generated if there is an indication that not all occupants have engaged their safety harness. In another embodiment, the system will prevent the lift bucket from moving off the ground until all occupants have engaged their safety harness.

In yet another implementation to be described below, the system provides a mechanism for logging pre-deployment safety checks. In a required pre-deployment safety check, the operation of the lift bucket and its controls are tested with no occupants in the lift bucket. In this embodiment, the system verifies that no occupants are in the lift bucket and tracks the various safety checks that are performed by an operator on the ground. The system also provides for a logging mechanism to confirm that the pre-deployment safety checks have been performed.

Figure 1:
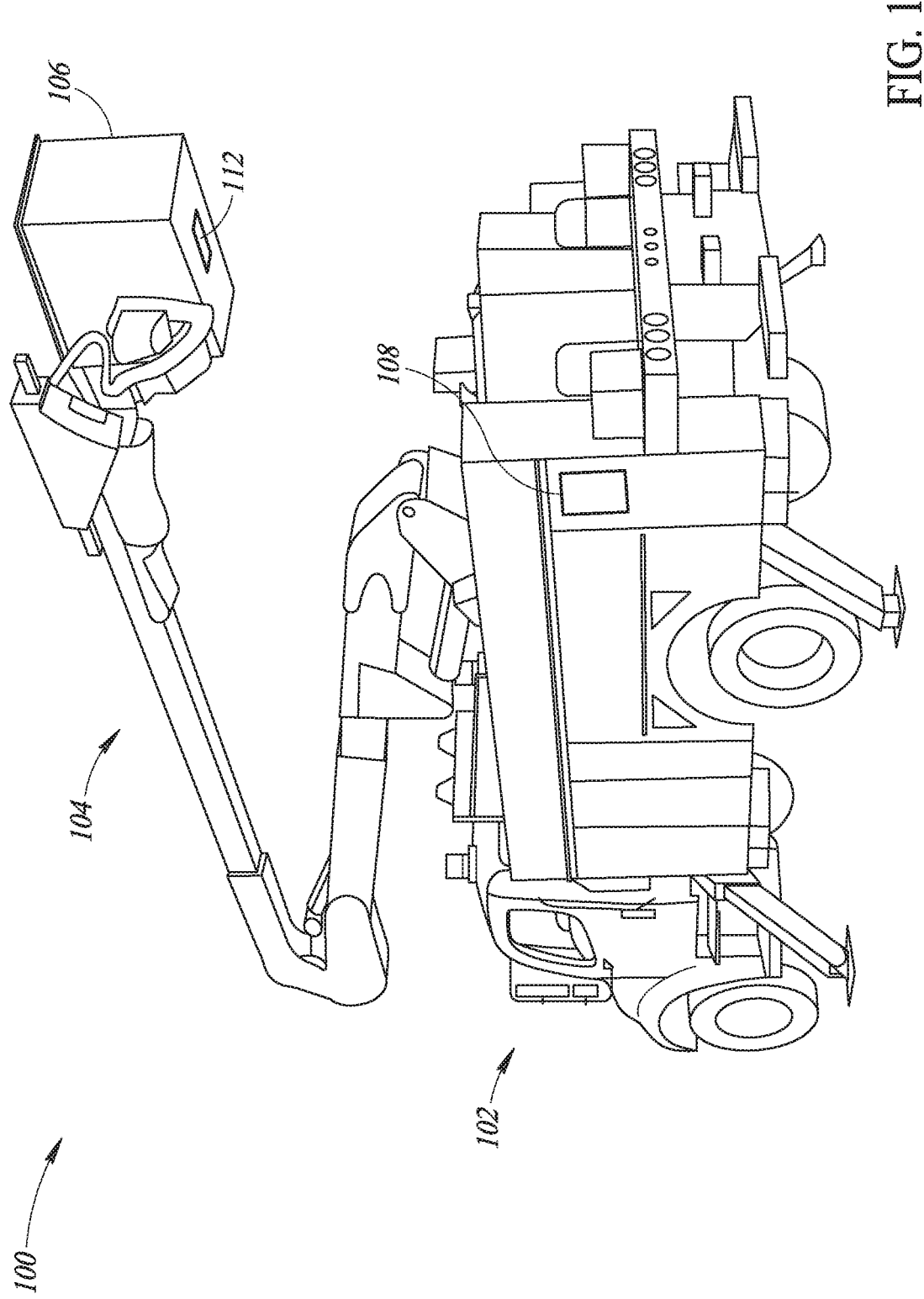
FIG. 1 illustrates a vehicle with an attached lift boom and bucket.

FIG. 1 illustrates a system 100 as implemented on a work vehicle 102. As illustrated, the work vehicle 102 includes an aerial lift 104 and a multi-person lift bucket 106. The lift bucket 106 illustrated in FIG. 1 is but one example of an aerial lift device. Another example of an aerial lift device is an aerial lift platform or aerial work platform, which may be attached to a vertical lift structure that is designed to move the lift platform vertically. Instead of standing in the lift bucket 106, the occupants stand on the platform. The lift platform is typically constructed with a railing around the periphery to protect the occupants. The section of the aerial lift that holds the occupants may be referred to as the occupant portion of the aerial lift. While the system 100 will be described with reference to the lift bucket 106, those skilled in the art will appreciate that the principles of the system 100 can be implemented on any aerial lift device to determine the number of occupants in the occupant portion of any aerial lift device.

The system 100 can determine the number of people in the lift bucket 106. As will be discussed in detail below, the system 100 includes a plurality of sensors 110 to determine whether there is more than one person in the lift bucket 106. In addition, a sensor 112 is mounted on the bottom or other exterior portion of the lift bucket 106 to detect when the lift bucket moves up off the ground. The sensor 112 may also include a barometric pressure sensor to determine the height of the lift bucket 106 off the ground during operation. If an unexpected event occurs, the barometric sensor can provide altitude data. In an exemplary embodiment, the altitude data can be stored in a data log. If the lift bucket 106 attempts to lift off the ground with more than one person in it, the system 100 will check to see if each person in the lift bucket has engaged their safety harness.

If, for example, there are two people in the lift bucket 106, but neither person or only one person has engaged their safety harness, an alarm will sound and, in one embodiment, the aerial lift 104 will be prevented from deploying and the lift bucket 106 will remain on the ground. Techniques for detecting engagement of a safety harness using a protection sensor unit 114 (see FIG. 2) for each occupant are known in the art. Some of these techniques are disclosed in U.S. Pat. No. 9,776,847 entitled COMPREHENSIVE WORKSITE AND TRANSPORTATION SAFETY SYSTEM, which is assigned to the assignee of the present application. The disclosure of U.S. Pat. No. 9,776,847 is incorporated herein in its entirety.

The system 100 also includes a data acquisition and communications unit (DACU) 108 that receives and analyzes data from the sensors 110 and generates alarms if unsafe conditions are detected. The sensors 110 are wirelessly connected to the DACU 108 using known communications protocols, including, but not limited to, Zigbee, Bluetooth, WiFi, or the like. The system 100 is not limited by the particular form of wireless connection between the sensors 110 and the DACU 108. In an exemplary embodiment, the aerial lift sensor 112 and the protection sensor units 114 are also wirelessly connected to the DACU 108.

The aerial lift sensor 112 is attached to the bottom or other exterior portion of the lift bucket 106 and detects when the lift bucket lifts off the ground. As the lift bucket 106 is raised just a few inches off the ground, the aerial lift sensor 112 detects the separation from the ground and notifies the DACU 108 that the lift bucket is being deployed. In response to the lift bucket 106 being deployed, the DACU 108 can read data from the sensors 110a-110c to determine the number of occupants in the lift bucket. Then the DACU 108 reads data from the protection sensor units 114 to determine that the safety harness has been engaged for each occupant in the lift bucket 106. If the numbers match, indicating that each occupant has engaged their safety harness, the DACU 108 permits the continued deployment of the lift bucket 106. Otherwise, alarms are sounded and the DACU 108 can halt the deployment of the lift bucket 106 while it is still only a short distance above the ground.

In one embodiment, an alarm disable button (not shown) can be attached to the lift bucket 106 in a location where it can be activated by an occupant in the lift bucket. The alarm disable button is wirelessly connected to the DACU 108. Activation of the alarm disable button will cause the DACU 108 to silence the local audible alarm in the notification unit 120. In an exemplary embodiment, activation of the alarm disable button will also generate an event notification for transmission to the remote server 122 (see FIG. 2). The event notification can be logged by the remote server 122.

Figure 2:
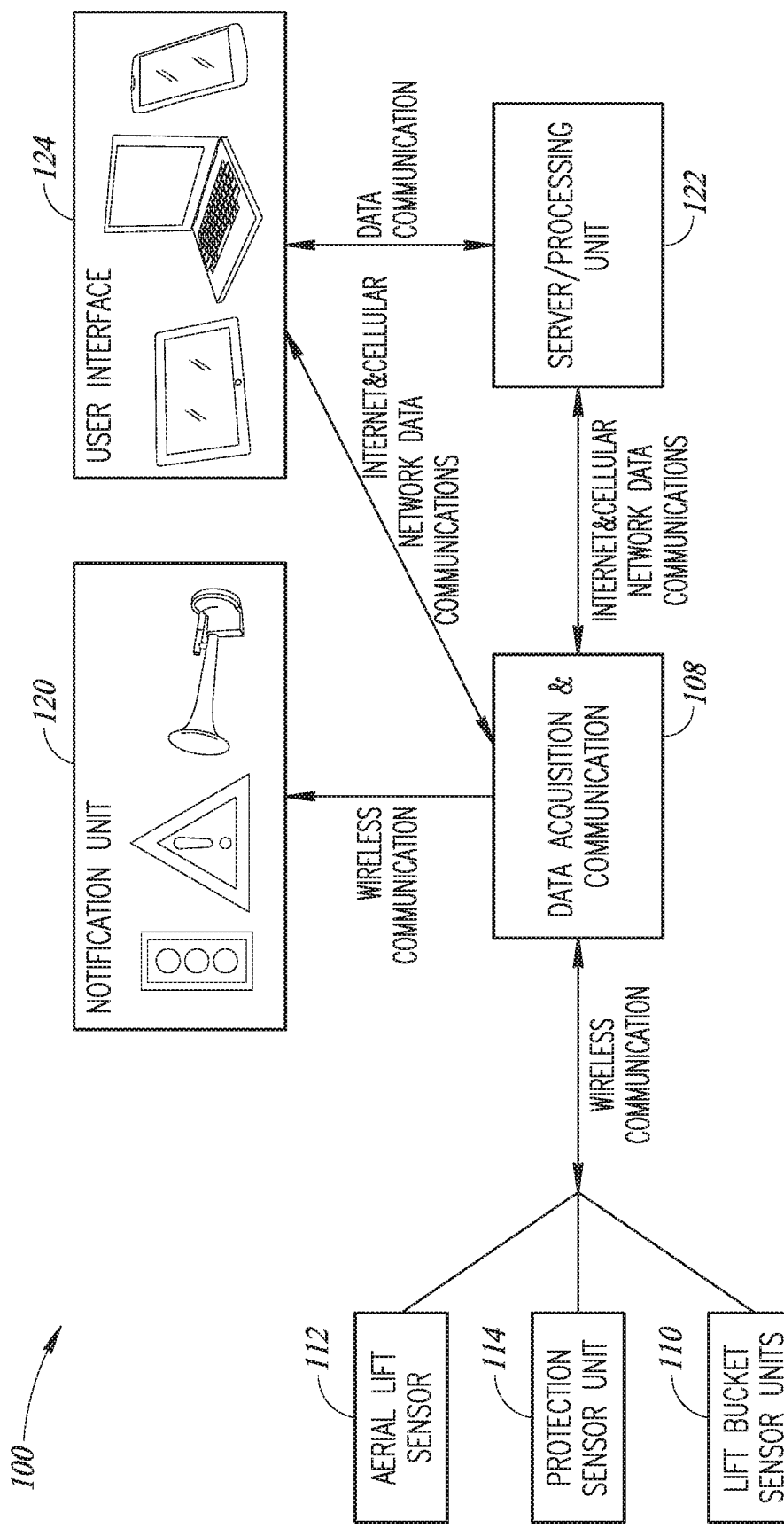
FIG. 2 is a functional diagram of the system of FIG. 1.

FIG. 2 illustrates the integration of the DACU 108 into the system 100. The DACU 108 analyzes the data from the sensors 110 to determine the number of occupants in the lift bucket 106. The DACU 108 also uses the data from the safety harness protection sensor units 114 to determine if the number safety harness connections matches the number of occupants, indicating that all occupants are properly secured in the lift bucket 106. If all occupants are safely secured in the lift bucket 106, normal operation of the aerial lift 104 can proceed. If the DACU 108 determines that one or more occupants are not properly secured, an alarm condition is generated.

FIG. 2 also illustrates a notification unit 120. If the DACU 108 detects a safety risk condition, it communicates wirelessly with the notification unit 120. In response, the notification unit 120 may generate local audible and visual warning indicators to alert workers of a safety risk. The audible warning may be, for example, a horn or siren. The visual warning indicator may be a light on the exterior of the work vehicle 102 (see FIG. 1) or visual indicators located on an interior of the work vehicle or the lift bucket 106. The DACU 108 may further provide alert and notification data to a remote server/processing unit 122 via a cellular or satellite communication link. In one embodiment, the link with the remote server 122 may be established using a wide area network (WAN), such as the Internet.

A user interface 124 may receive the alert messages and communicate the safety risk information to a system operator or high level employees to provide information regarding safety issues in the field. Those individuals can contact a field supervisor to take corrective actions.

Figure 3A:
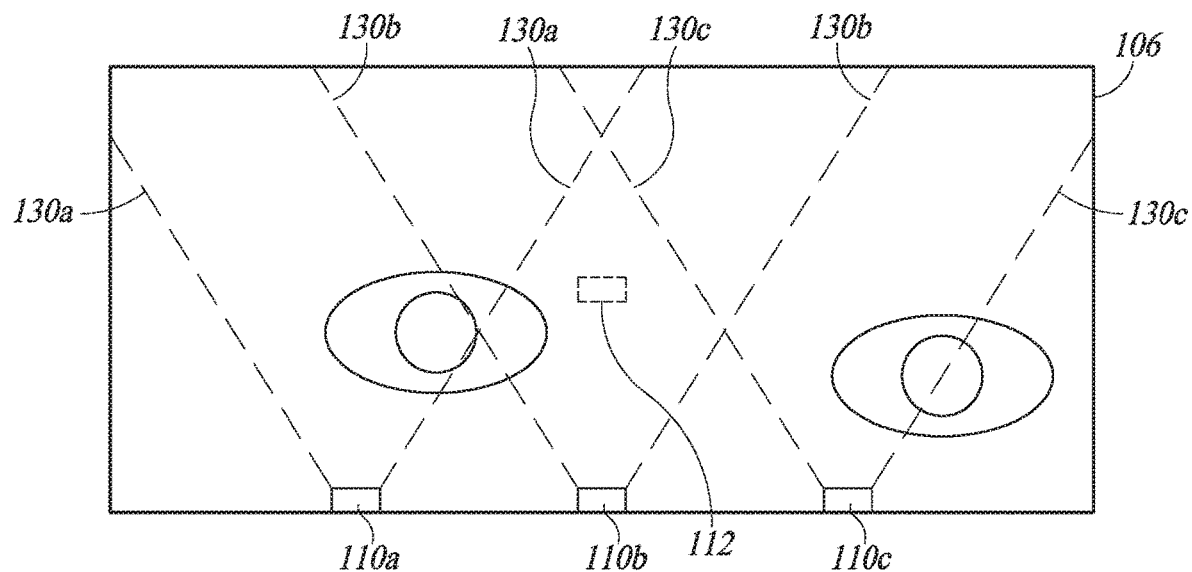
FIG. 3A is a top view of the bucket of FIG. 1 illustrating a sensor array in the bucket.
Figure 3B:
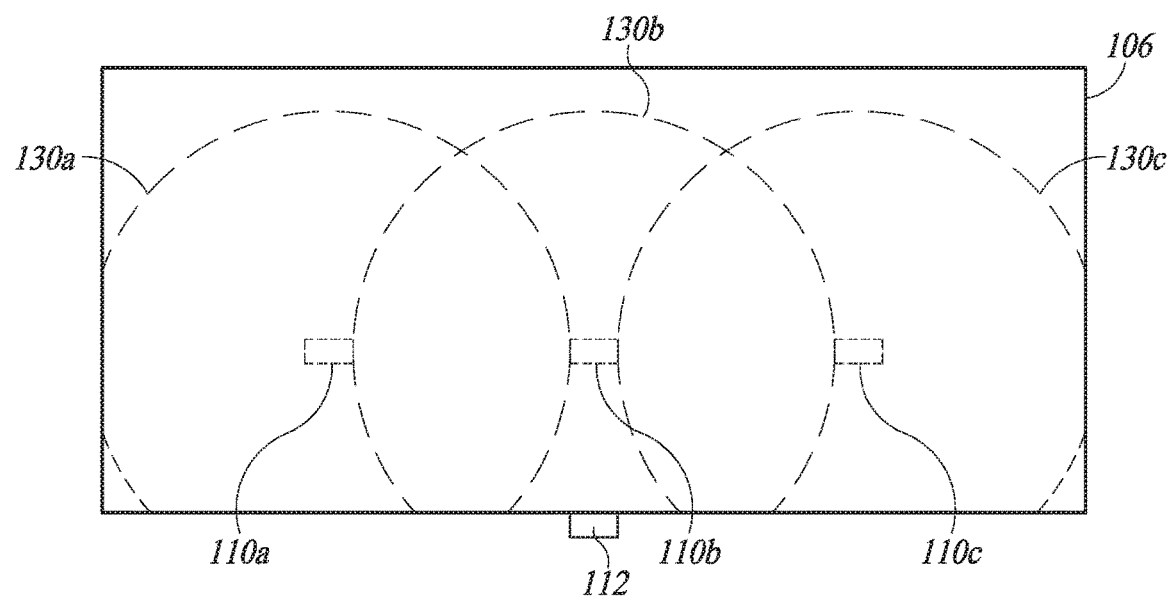
FIG. 3B is a side view of the bucket of FIG. 1 illustrating sensor positioning in the bucket.

FIGS. 3A-3B illustrate the placement of the sensors 110 within the lift bucket 106. FIG. 3A is a top view of the lift bucket 106. In an exemplary embodiment, three sensors 110a-110c are spaced approximately equidistant from each other on a sidewall of the interior portion of the lift bucket 106. FIG. 3B illustrates the positioning of the sensors 110a-110c approximately 2-2.5 feet from the bottom surface of the lift bucket 106. The sensors 110a-110c may be infrared sensors or ultrasonic sensors. In an exemplary embodiment, the sensors 110a-110c are ultrasonic sensors, such as a product provided by Murata, Model MA401H1S-R. Other similar devices may also be satisfactorily employed for the sensors 110a-110c.

The sensors 110a-110c are each powered by batteries that allow them to collect and transmit data and also receive updates for over 5 years. In some embodiments, the ultrasonic sensors 110a-110c may be coupled with ambient temperature sensors if temperature measurements are needed to calibrate the sensors. In an exemplary embodiment, the aerial lift sensor 112 is the same type as the sensors 110a-110c and has the same characteristics. As previously noted, the aerial lift sensor 112 may also include a barometric pressure sensor to track the height of the lift bucket 106 during its deployment.

Each of the sensors 110a-110c has a respective coverage zone 130a-130c illustrated by the dashed lines in FIG. 3A. Those skilled in the art will appreciate that the coverage zones 130a-130c are three-dimensional and generally conical in nature. The coverage zones illustrated in FIG. 3B help illustrate that principal. Other sensor type may have a different three-dimensional zone of coverage. As illustrated in FIGS. 3A-3B, the zones of coverage 130a-130c are slightly overlapping. This provides adequate coverage throughout the interior portion of the lift bucket 106. The sensors 110a-110c will detect the presence of a human occupant if the occupant is within the respective coverage zones 130a-130c.

Although FIGS. 3A-3B illustrate the use of three sensors (sensors 110a-110c), those skilled in the art will appreciate that the number of sensors can vary based on the size of the lift bucket 106 and the coverage zone 130 of the individual sensors.

Data from the sensors 110a-110c are wirelessly communicated to the DACU 108 (see FIG. 2). The DACU applies an algorithm to determine whether one or two occupants are in the lift bucket 106. If only one sensor (e.g., sensor 110a) detects the presence of an occupant, the DACU 108 will determine that only one occupant is in the lift bucket 106. Similarly, if two adjacent sensors (e.g., sensors 110a-110b) detect the presence of an occupant, the DACU 108 will also determine that there is only one occupant in the lift bucket 106. However, if two non-adjacent sensors (e.g., sensor 110a and 110c) detect the presence of an occupant, the DACU 108 will determine that two occupants are in the lift bucket 106. In the example illustrated in FIG. 3A, one occupant is within the zones of coverage of adjacent sensors 130a-130b. In addition, a second occupant is only within the zone of coverage 130c. In this example, because non-adjacent sensors (i.e., the sensors 110a and 110c) have both detected occupants, the DACU 108 will determine that there are two occupants in the lift bucket 106.

Table 1 below illustrates the sensor pattern used by the DACU 108 (see FIG. 2) to determine the number of occupants in the lift bucket. The "X" in the column indicates that an occupant has been detected by the particular sensor. As illustrated in Table 1, if only one of the sensors (i.e., sensor 110a, sensor 110b, or sensor 110c) detects an occupant, the DACU 108 will determine that only one occupant is in the lift bucket 106. In addition, if only two adjacent sensors (i.e., either sensor 110*a* and sensor 110*b* or sensor 110*b* and sensor 110*c*) detect an occupant, the DACU 108 will also determine that there is only one occupant in the lift bucket 106. Finally, if two non-adjacent sensors (i.e., sensor 110*a* and sensor 110*c* or sensor 110*a*, sensor 110*b*, and sensor 110*c*) detect an occupant, the DACU 108 will determine that there are two occupants in the lift bucket 106. As previously discussed, the DACU will further determine how many of the protection sensor units 114 have been activated to indicate that the worker safety harness has been engaged. The number of sensor protection units 114 that indicate engagement of a safety harness should match the number of occupants determined to be in the lift bucket 106. If they do not match, an alarm condition exists.

TABLE 1

| Occupants | Sensor 110a | Sensor 110b | Sensor 110c |
|---|---|---|---|
| 1 | X | | |
| 1 | | X | |
| 1 | | | X |
| 1 | X | X | |
| 1 | | X | X |
| 2 | X | | X |
| 2 | X | X | X |

Figure 4:
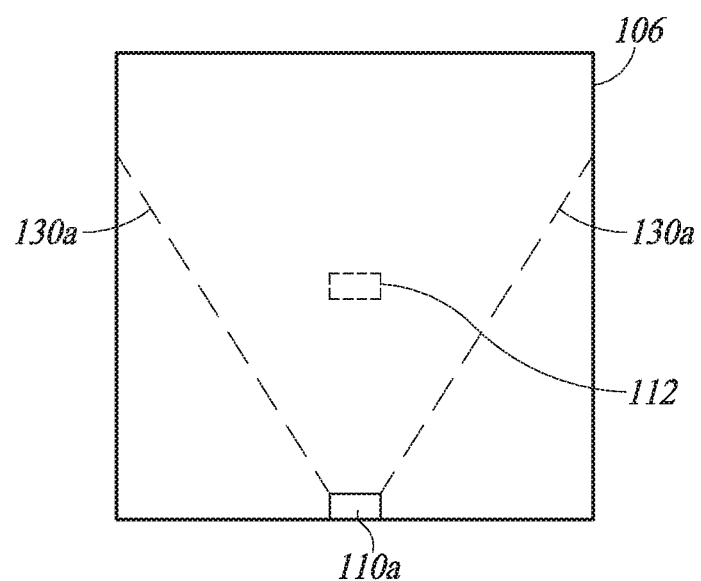
FIG. 4 is a top view of a single occupancy lift bucket illustrating a single sensor in the bucket.

FIG. 4 is a top view illustrating an embodiment of the system 100 with a single occupancy lift bucket 106. In this embodiment, only a single sensor 110*a* is deployed in the interior portion of the lift bucket 106 and a single aerial lift sensor 112 is attached to the bottom of the lift bucket.

With only a single occupant, the decision process by the DACU 108 (see FIG. 2) becomes a binary decision. That is, the lift bucket 106 either has an occupant or does not. In this embodiment, there is no need to match the number of sensors with the activation of protection sensor units 114. Since there is only a single occupant in the lift bucket 106, only one safety harness protection sensor unit 114 will be activated if the safety harness has been properly engaged.

Figure 5:
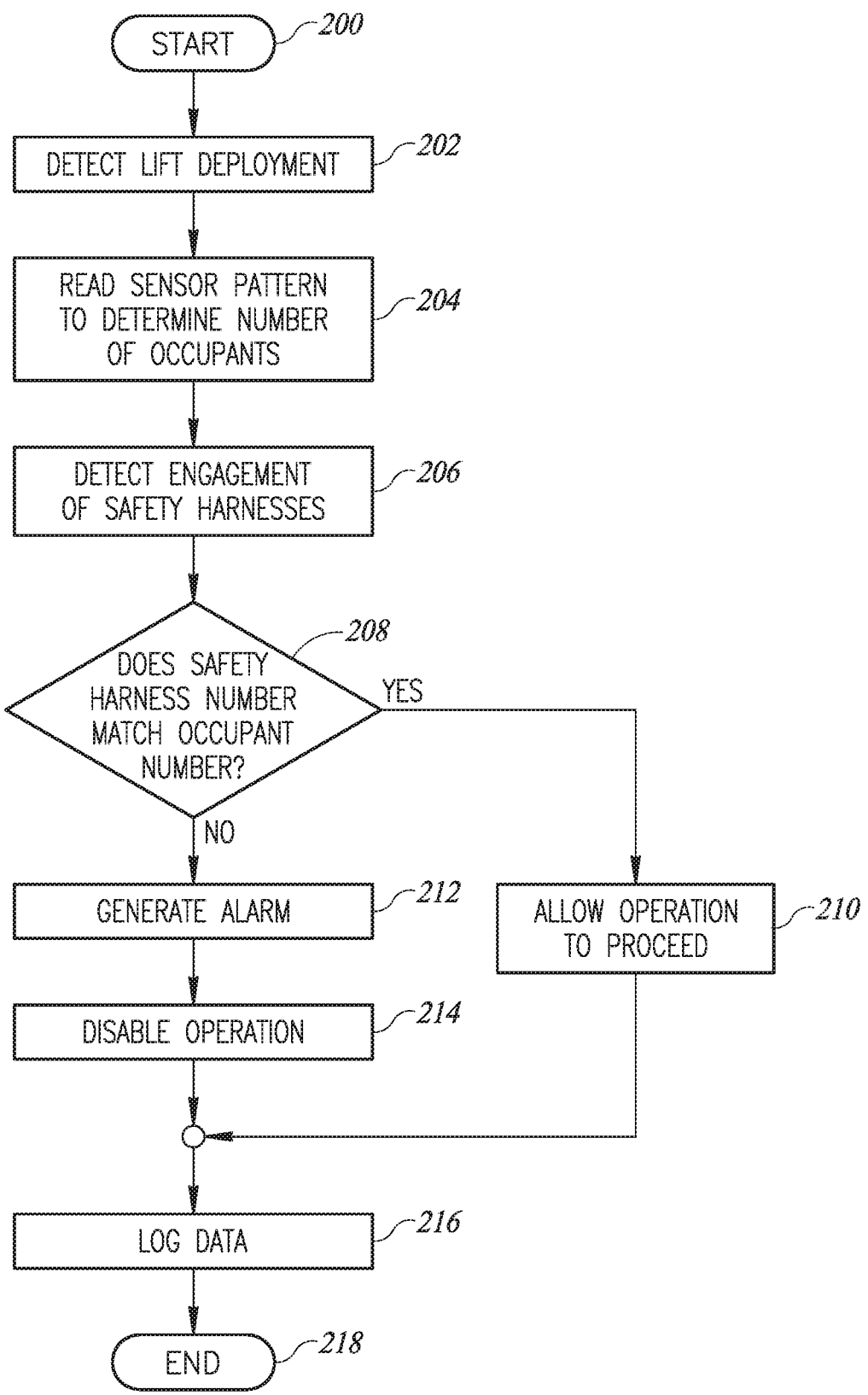
FIG. 5 is a flowchart illustrating the operation of the system to determine the number of occupants in the multi-person lift bucket.

FIG. 5 is a flow chart illustrating the operation of the system 100 for the multiple occupancy lift bucket 106. At a start 200, the work vehicle 102 is on location at a work site and the system 100 is activated. In step 202, the DACU 108 detects activation of the aerial lift sensor 112 indicating that the lift bucket 106 is being deployed. In step 204, the DACU 108 (see FIG. 2) reads the sensor pattern from the sensors 110*a*-110*c* to determine the number of occupants. In step 206, the DACU 108 detects the engagement of one or more safety harnesses.

In decision 208, the DACU 108 determines whether the number of safety harnesses that have been satisfactorily engaged matches of the number of occupants in the lift bucket 106. If the numbers match, the result of decision 208 is YES and, in step 210, the DACU 108 allows operation of the aerial lift 104 to proceed.

If the number of safety harnesses engaged does not match the determined number of occupants in the lift bucket 106, the resultant decision 208 is NO. In that event, the DACU 108 generates an alarm in step 212 and, optionally, may disable operation of the aerial lift 104 in step 214. In addition, whether the result of decision 208 is YES or NO, the results data may be logged in step 216 and the process ends at 218.

The process for the single occupancy lift bucket illustrated in FIG. 4 is similar except that there is no sensor pattern needed to determine the number of occupants. If an occupant is in the lift bucket, the safety harness must be engaged. If the safety harness is engaged, the operation is allowed to proceed at step 210. Otherwise, the alarm is generated in step 212 and, optionally, operation of the aerial lift 104 is disabled in step 214. In either event, the data is logged at step 216 and the process ends at 218.

In a variation of the flow chart of FIG. 5, when the alarm is generated in step 212, the occupant may respond to the alarm condition by properly engaging their safety harness. The DACU 108 periodically or continuously reads data from each of the protection sensor units 114 and will detect that the occupant has properly engaged their safety harness. The proper engagement of the safety harness causes the system 100 to return to decision 208 where the result of decision 208 is YES if all occupants are now protected by proper engagement of their respective safety harness. In that event, operations may proceed in step 210 as described above.

In an exemplary embodiment, the DACU 108 can further periodically or continuously read data from each of the protection sensor units 114 to determine that the safety harness remains engaged for each occupant in the lift bucket 106. If an occupant disengages the safety harness while the lift bucket 106 is deployed, the DACU 108 detects the safety violation and activates the notification unit 120 to sound an alarm. The alarm condition may also generate a notification report to the remote server 122.

In another aspect, the system 100 provides a mechanism for testing the operation of the aerial lift 104 prior to deploying the lift bucket 106 with workers in it. OSHA regulations call for testing the operation parameters on the work vehicle 102 before workers get into the lift bucket 106. In an exemplary embodiment, the system 100 provides a logging mechanism to verify that the proper operational tests were performed on the work vehicle 102 and aerial lift 104.

Figure 6:
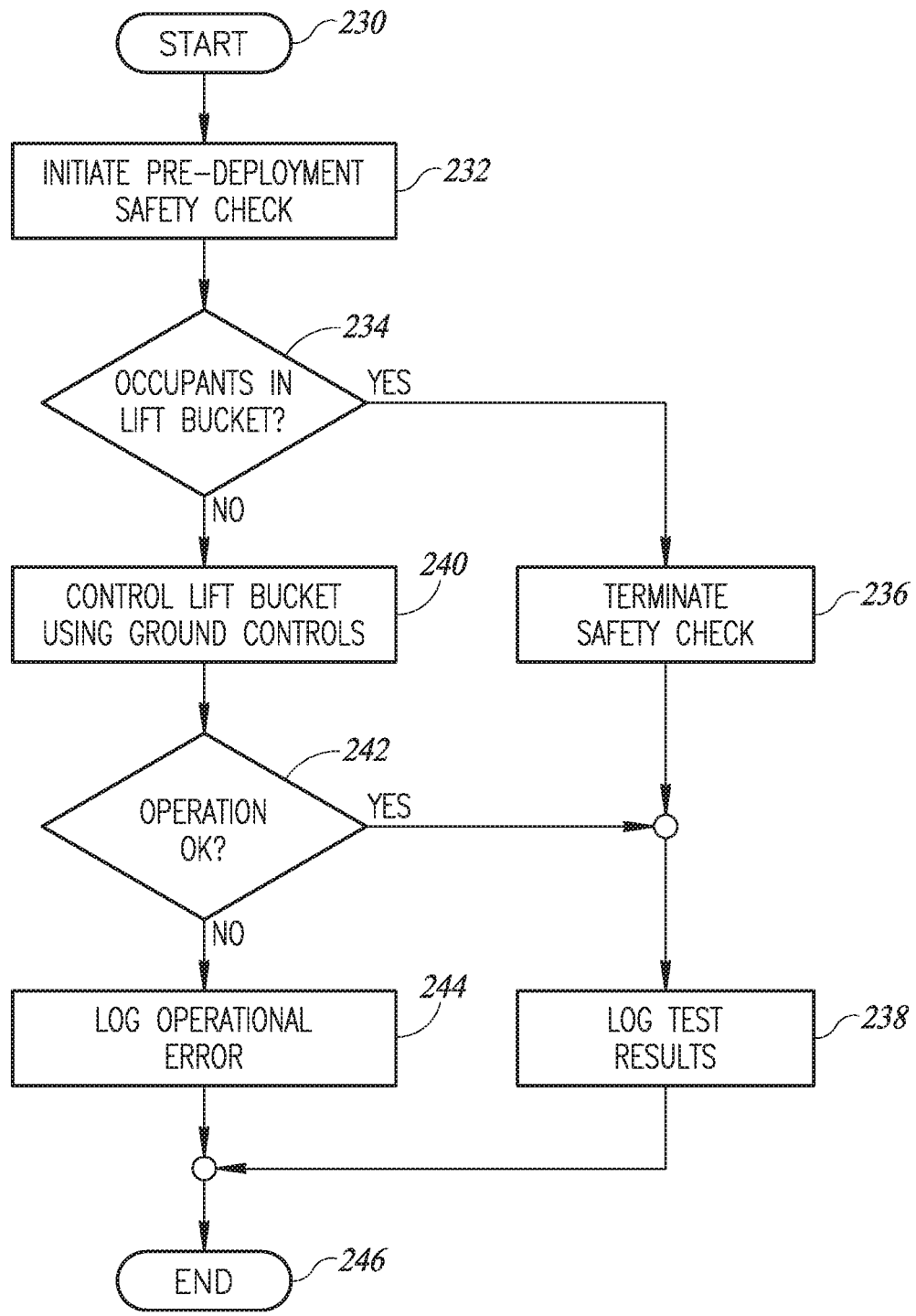
FIG. 6 is a flowchart illustrating the operation of the system to verify proper pre-deployment safety checks of the aerial lift.

The flowchart of FIG. 6 illustrates the operation of the system 100 to verify pre-deployment safety checks. At a start 230, the work vehicle 102 (see FIG. 1) is at a work site. In step 232, the operator initiates the pre-deployment safety check. In decision 234, the system 100 determines if there are any occupants in the lift bucket 106. As previously noted, pre-deployment safety checks are supposed to be performed with no occupants in the lift bucket 106. Operation testing of the aerial lift 102 is not performed using the controls in the lift bucket 106, but are controlled by a redundant set of controls on the ground.

If there are occupants in the lift bucket, the result of decision 234 is YES. In that event, the system 100 terminates the safety check for violation of the safety rules in step 236. The test results, including the safety violation, are logged in step 238 and the safety check process ends at 246. If there are no occupants in the lift bucket, the result of decision 234 is NO. In that event, the system 100 permits the safety check process to continue.

At step 240, the vehicle operator uses the set of ground controls to run the aerial lift 104 through various operations. The specific test operations may vary from one aerial lift to another and need not be described in detail herein. In decision 240, the system 100 verifies satisfactory operation of the aerial lift 104 for all of the required tests. If the aerial lift 104 successfully passed all tests, the result of decision 242 is YES. In that event, the successful test results are logged in step 238 and the safety check process ends at 246. If the aerial lift 104 failed one or more tests, the result of decision 242 is NO. In that event, the operational error or errors are logged in step 244 and the safety check process ends at 246. In addition, the system 100 will not permit deployment of the lift bucket 106 with any occupants until the safety violations are all resolved.

Thus, the system and method disclosed herein provide an integrated safety solution for the use of an aerial lift. The number of occupants is matched with the number of engaged safety harnesses. The lift bucket 106 may not be deployed unless each occupant has successfully engaged their respective safety harness. In addition, the present disclosure provides techniques for pre-deployment safety testing and provides a log report that may be used later to verify that the safety checks were performed with no occupants in the lift bucket.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and; therefore, the appended claims are to encompass within their scope all such changes and modifications as are within the true spirit and scope of this invention. Furthermore; it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended; such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation; even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A safety system for matching a number of occupants in an aerial lift device having an occupant portion and a plurality of safety harnesses each generating an engagement signal indicative of proper engagement of the safety harnesses, the system comprising:
   a plurality of sensors positioned along a length of at least one side of the occupant portion of the aerial lift device to detect a presence of an occupant a, each of the plurality of sensors being configured to generate an output signal indicating the presence or absence of the occupant within a detection range of the respective sensor;
   a processor communicatively coupled to the plurality of sensors and being configured to receive the output signal from each of the respective sensors, and to determine a number of occupants in the occupant portion of the aerial lift device based on a pattern of the output signals from the plurality of sensors, the processor being further configured to receive the engagement signal from each properly engaged safety harness and to determine whether the number of occupants in the occupant portion of the aerial lift device matches a number of properly engaged safety harnesses; and
   a notification unit coupled to the processor and configured to provide an alarm notification if the number of properly engaged safety harnesses does not match the determined number of occupants in the occupant portion of the aerial lift.

2. The system of claim 1 wherein the plurality of sensors comprises three sensors, the processor determining that there is a single occupant in the occupant portion of the aerial lift device if the pattern of output signals is that one sensor or two adjacent sensors generate output signals indicating the presence of the occupant within the detection range of the respective sensors and determining that there are two occupants in the occupant portion of the aerial lift device if the pattern of output signals is that two non-adjacent sensors generate output signals indicating the presence of the occupants within the detection range of the respective sensors.

3. The system of claim 1 wherein the processor is further configured to disable operation of the aerial lift device if the number of properly engaged safety harnesses does not match the determined number of occupants in the occupant portion of the aerial lift device.

4. The system of claim 1, further comprising an aerial lift sensor affixed to an exterior portion of the occupant portion of the aerial lift device, the aerial lift sensor being configured to generate an output signal to indicate when the occupant portion of the aerial lift device is activated to lift up from the ground, the aerial lift sensor being communicatively coupled to the processor to indicate to the processor that the occupant portion of the aerial lift device has lifted up from the ground, the processor being further configured to disable operation of the aerial lift device to prevent the occupant portion of the aerial lift device from being further lifted off the ground if the number of properly engaged safety harnesses does not match the determined number of occupants in the occupant portion of the aerial lift device.

5. The system of claim 1 wherein the sensors are ultrasonic sensors.

6. The system of claim 1 wherein the sensors are battery operated sensors.

7. The system of claim 1, further comprising a wireless communication unit in each of the plurality of sensors wherein the processor is communicatively coupled to the plurality of sensors using the wireless communication unit in each respective sensor.

8. The system of claim 1, further comprising a wireless communication unit in the notification unit wherein the processor is coupled to the notification unit using the wireless communication unit in the notification unit.

9. The system of claim 1 wherein the processor is part of a data acquisition and communication unit (DACU), the DACU comprising a communications unit to report alarm notifications to a remote server.

10. The system of claim 1 for use in a pre-operational safety test wherein the aerial lift device is operated with no occupants in the lift bucket.

11. The system of claim 10 wherein the processor is further configured to generate a data log of the pre-operational safety test.

12. The system of claim 1 wherein the processor is further configured to receive the output signal from each of the respective sensors, to determine the number of occupants in the occupant portion of the aerial lift device based on the pattern of the output signals from the plurality of sensors, to receive the engagement signal from each properly engaged safety harness and to determine whether the number of occupants in the occupant portion of the aerial lift device matches the number of properly engaged safety harnesses throughout deployment of the aerial lift device, the notification unit being further configured to provide the alarm notification if the number of properly engaged safety harnesses does not match the determined number of occupants in the occupant portion of the aerial lift device throughout deployment of the aerial lift device.

13. The system of claim 1 wherein the aerial lift device includes a lift bucket, an interior portion of the lift bucket being the occupant portion of the aerial lift device.

14. A method for operating an aerial lift device having an occupant portion, the method comprising:
electronically sensing a presence of occupants in the occupant portion using one or more sensors positioned along a length of at least one side of the occupant portion;
determining a number of occupants in the occupant portion based on output signals from the one or more sensors;
electronically sensing proper engagement of one or more safety harnesses;
determining whether the number of occupants in the occupant portion matches a number of properly engaged safety harnesses; and
initiating an alarm condition if the number of properly engaged safety harnesses does not match the determined number of occupants in the occupant portion.

15. The method of claim 14 wherein the one or more sensors comprises three sensors, electronically sensing the presence of occupants in the occupant portion uses three sensors positioned along at least one side of the occupant portion, determining the number of occupants in the occupant portion is based on the output signals from three sensors positioned along at least one side of the occupant portion and comprises determining that there is a single occupant in the occupant portion if one sensor or two adjacent sensors sense the presence of occupants in the occupant portion, and determining that there are two occupants in the occupant portion if two non-adjacent sensors sense the presence of occupants in the occupant portion.

16. The method of claim 14 wherein the one or more sensors comprises one sensor for use in a single occupancy occupant portion, electronically sensing the presence of occupants comprises electronically sensing the presence of a single occupant, and electronically sensing proper engagement comprises electronically sensing proper engagement of a single safety harness.

17. The method of claim 14, further comprising disabling operation of the aerial lift device if the alarm condition is initiated.

18. The method of claim 14, further comprising electronically sensing the occupant portion lifting off the ground using an aerial lift sensor positioned on an exterior surface of the occupant portion wherein electronically sensing the presence of occupants in the occupant portion, determining the number of occupants in the occupant portion, electronically sensing proper engagement, and determining whether the number of occupants in the occupant portion matches the number of properly engaged safety harnesses occurs in response to electronically sensing the occupant portion lifting off the ground.

19. The method of claim 18, further comprising a barometric pressure sensor mounted in proximity with the aerial lift sensor, the barometric pressure sensor providing altitude data while the aerial lift device is deployed.

20. The method of claim 14 wherein the sensors are ultrasonic sensors.

21. The method of claim 14 wherein the sensors are battery operated sensors.

22. The method of claim 14 wherein electronically sensing the presence of occupants in the lift bucket comprises wirelessly sensing the presence of occupants in the lift bucket.

23. The method of claim 14 wherein initiating the alarm condition comprises wirelessly communicating with a notification unit to signal the alarm condition to the notification unit.

24. The method of claim 14, further comprising reporting the alarm condition to a remote server.

25. The method of claim 14 for use in a pre-operational safety test, the method further comprising operating the aerial lift device with no occupants in the lift bucket.

26. The method of claim 25 further comprising generating a data log of the pre-operational safety test.

27. The method of claim 14 wherein electronically sensing the presence of occupants, determining the number of occupants, electronically sensing proper engagement of safety harnesses, determining whether the number of occupants matches the number of properly engaged safety harnesses, and initiating the alarm condition is repeated throughout deployment of the aerial lift device.

28. The method of claim 14 wherein the aerial lift device includes a lift bucket, an interior portion of the lift bucket being the occupant portion of the aerial lift device.

* * * * *